(12) United States Patent
Wacker

(10) Patent No.: US 7,787,994 B2
(45) Date of Patent: Aug. 31, 2010

(54) SINGLE LINE CONTROL FOR HVAC ACTUATOR

(75) Inventor: Paul C. Wacker, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 314 days.

(21) Appl. No.: 11/470,200

(22) Filed: Sep. 5, 2006

(65) Prior Publication Data

US 2008/0058966 A1 Mar. 6, 2008

(51) Int. Cl.
*G05B 13/00* (2006.01)

(52) U.S. Cl. ............ 700/276; 340/310.11; 340/310.12; 700/19; 700/20

(58) Field of Classification Search ............. 700/276; 318/618, 254.1, 255, 811; 62/125–131, 157, 62/231; 388/800–806, 809–815
See application file for complete search history.

(56) References Cited

U.S. PATENT DOCUMENTS

| | | | |
|---|---|---|---|
| 4,287,468 A * | 9/1981 | Sherman | 323/322 |
| 4,484,122 A | 11/1984 | Day et al. | |
| 4,497,031 A | 1/1985 | Froehling et al. | |
| 4,630,221 A | 12/1986 | Heckenbach et al. | |
| 4,825,133 A * | 4/1989 | Tanuma et al. | 318/113 |
| 5,142,214 A * | 8/1992 | Purson et al. | 318/722 |
| 5,299,432 A * | 4/1994 | Nakae et al. | 62/298 |
| 5,350,988 A * | 9/1994 | Le | 318/618 |
| 5,491,395 A | 2/1996 | Hutsell et al. | |
| 5,600,310 A | 2/1997 | Whipple, III et al. | |
| 5,810,245 A | 9/1998 | Heitman et al. | |
| 5,839,654 A * | 11/1998 | Weber | 236/47 |
| 6,108,614 A | 8/2000 | Lincoln et al. | |
| 6,121,735 A * | 9/2000 | Igeta et al. | 318/101 |
| 6,192,922 B1 | 2/2001 | MacGibbon et al. | |
| 6,222,333 B1 | 4/2001 | Garnett et al. | |
| 6,339,302 B1 * | 1/2002 | Greenbank et al. | 318/103 |
| 6,545,438 B1 * | 4/2003 | Mays, II | 318/400.01 |
| 6,611,117 B1 | 8/2003 | Hardt | |

(Continued)

FOREIGN PATENT DOCUMENTS

KR     20030087810     11/2003

OTHER PUBLICATIONS

"Micro-Electric Multiposition Valve Actuator Installation and Use," VICI, Valco Instruments Co. Inc., Technical Note 415.*

(Continued)

*Primary Examiner*—Paul L Rodriguez
*Assistant Examiner*—Carlos Ortiz-Rodriguez
(74) *Attorney, Agent, or Firm*—Crompton Seager & Tufte LLC

(57) ABSTRACT

Methods and systems for controlling an HVAC actuator using a single output control signal are disclosed. In one illustrative embodiment, the single output control signal may be a digital signal that serially encodes desired position data (either an absolute position or a relative position) for the HVAC actuator. In some cases, the single output control signal is provided by a controller remote from the HVAC actuator, and is received by the HVAC actuator. The HVAC actuator may include a controller for decoding the serially encoded data contained in the single output control signal, and for controlling the HVAC actuator accordingly.

17 Claims, 3 Drawing Sheets

U.S. PATENT DOCUMENTS

| | | | |
|---|---|---|---|
| 6,633,145 B2 | 10/2003 | Shao et al. | |
| 6,738,250 B2 | 5/2004 | Joseph et al. | |
| 6,895,176 B2 | 5/2005 | Archer et al. | |
| 6,979,965 B2 | 12/2005 | McMillan et al. | |
| 7,034,707 B2 * | 4/2006 | Aisa | 340/662 |
| 2003/0098666 A1 | 5/2003 | Shao et al. | |
| 2004/0000885 A1 | 1/2004 | Shao | |
| 2004/0051496 A1 | 3/2004 | Archer et al. | |
| 2004/0085040 A1 | 5/2004 | Chen | |

OTHER PUBLICATIONS

"SV203/300- Servo Motor Controller Board", Jameco Part No. 153648, Pontech 1997.*

Castagnet et al., "Digital Control for a Brush DC Motor," ST Microelectronics, 9 pages, 1999.

http://www.techsavvy.com/industry/file/national/03twj/mgi10.html?id=117388&comp_id=0..., "MOOG Brushless Motor Controllers and Electronics," Moog Inc., 2 pages, printed May 9, 2006.

"MC73110 Motor Control IC," Performance Motion Control Devices, 4 pages, 2003.

"Micro-Electric Multiposition Valve Actuator Installation and Use," VICI, Valco Instruments Co. Inc., Technical Note 415, 5 pages, prior to Sep. 5, 2006.

* cited by examiner

SINGLE LINE CONTROL FOR HVAC ACTUATOR

FIELD

The present invention relates generally to HVAC actuators, and more particularly to a method and system for controlling an HVAC actuator with a single output control signal.

BACKGROUND

HVAC actuators are used in a wide variety of HVAC systems and applications. Such actuators can include, for example, air flow damper actuators, water valves, gas valves, as well as other actuators. In many cases, a motor is used to move the actuator, and a controller is used to provide control signals to cause the motor to drive the actuator to a desired actuated position.

HVAC actuator controllers produced today typically either provide analog output control signals or "floating" binary output control signals to control the position of the actuator. Analog output control signals are conventionally either 0-10 volt signals or 4-20 milliamp signals. HVAC actuator controllers that use analog output control signals must typically include a relatively expensive and accurate digital-to-analog (DA) converter. Furthermore, and during use in the field, analog output control signals can often be susceptible to electromagnetic noise that can affect the accuracy and/or reliability of the actuator control. Also, and at least in some cases, there may be a time lag due to the D/A conversion, which can effect the accuracy and/or reliability of the actuator control.

"Floating" binary output control signals can have some advantages over analog output control signals. For example, HVAC actuator controllers that provide floating binary output control signals do not typically require a digital-to-analog (DA) converter, are often less susceptible to electromagnetic noise, and are typically not subject to a time lag due to a D/A conversion. In a typical HVAC actuator that uses "floating" binary output control signals, the HVAC actuator controller provides two separate floating binary output control signals, each for commanding the actuated part to move in a particular direction (e.g. open or close). The term "floating" is used here to signify that the separate binary output control signals provide "relative position" control commands, rather than "absolute position" control commands to move the actuated part.

In one example one of the floating binary output control signals may be asserted high to move the damper actuator from whatever its current position is towards the "closed" position, while the other of the floating binary output control signals may be asserted to move the damper actuator from whatever its current position is towards the "open" position. Only one of the two floating binary output control signals is typically asserted at any given time.

In many cases, the amount or degree that the damper actuator is moved from its current position is dependent on the time interval that the floating binary output control signal is in the asserted state (e.g. high state). For example, if the controller asserts the floating binary output control signal that moves the damper actuator towards the "closed" position for 50 ms, the motor may move the damper actuator 2 degrees from its current position toward the "closed" position. As can be seen, and in this arrangement, the floating binary output control signals move the damper actuator relative to whatever its current position is, rather than commanding an absolute damper position (e.g. 60% open). The HVAC actuator controller must typically include software and/or hardware to indirectly keep track of the current position of the damper actuator, and make relatively position changes based on the desired position of the damper.

In today's market, the cost of an HVAC controller is typically directly related to the number of outputs on the controller. Even though floating binary outputs are cheaper to produce than analog outputs, a floating binary output controller still requires at least two separate outputs per HVAC actuator. What would be desirable, therefore, is a method and system for controlling an HVAC actuator that maintains the advantages of floating binary outputs, which includes high resolution with high noise immunity and lower cost, but requiring less controller outputs.

SUMMARY

The following summary of the invention is provided to facilitate an understanding of some of the innovative features unique to the present invention and is not intended to be a full description. A full appreciation of the invention can be gained by taking the entire specification, claims, drawings, and abstract as a whole.

The present invention relates generally to HVAC actuators, and more particularly to methods and systems for controlling an HVAC actuator with a single output control signal. In one illustrative embodiment, the single output control signal may be a digital signal that serially encodes desired position data (either an absolute position or a relative position) for the HVAC actuator. In some cases, the single output control signal is provided by a controller remote from the HVAC actuator. The HVAC actuator may include its own separate controller for decoding the serially encoded position data contained in the single output control signal, and controlling the position of the HVAC actuator accordingly.

BRIEF DESCRIPTION

The invention may be more completely understood in consideration of the following detailed description of various illustrative embodiments of the invention in connection with the accompanying drawings, in which.

DETAILED DESCRIPTION

Figure 1:
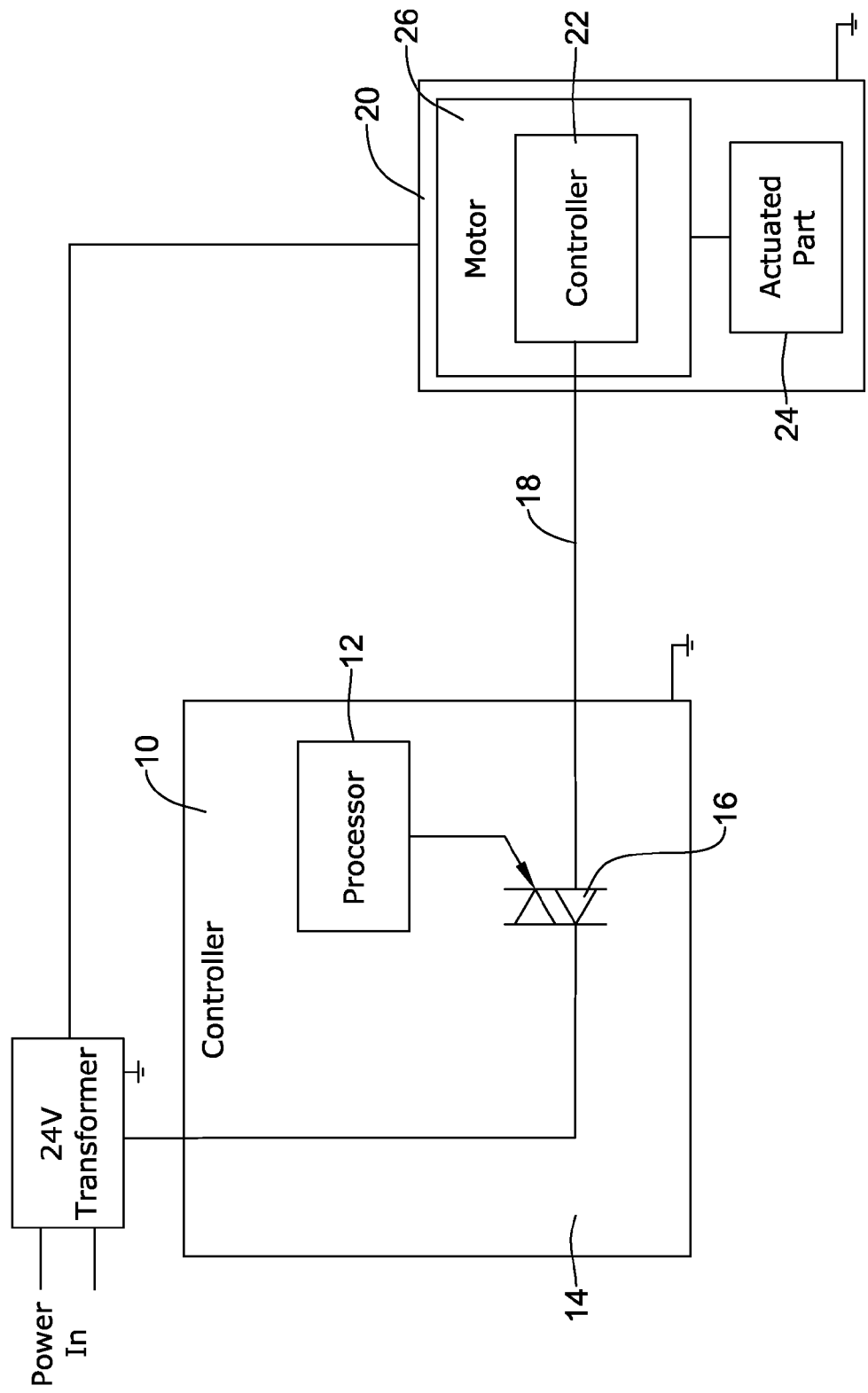
FIG. 1 is a schematic diagram of an illustrative example of a controller that provides a single output control signal for controlling an HVAC actuator.

The following description should be read with reference to the drawings wherein like reference numerals indicate like elements throughout the several views. The detailed description and drawings show several embodiments which are meant to be illustrative of the claimed invention.

FIG. 1 is a schematic diagram of an illustrative example of a controller 10 that is adapted to provide a single output control signal 18 for controlling an HVAC actuator 20. In some cases, the controller 10 is located remotely from the HVAC actuator 20. In the illustrative embodiment, the HVAC actuator 20 includes a controller 22, an actuated part 24 and an electric motor 26. The actuated part 24 may be, for example, an air flow damper, a water valve, a gas valve, and/or any other suitable actuatable part. The electric motor 26 can be selectively activated by the controller 22 to move the position of the actuated part 24 to a desired position.

In some illustrative embodiments, the controller 10 may provide a single output control signal 18 that is a digital or quasi digital signal that serially encodes a desired position of the actuated part 24 (either an absolute position or a relative position). The controller 22 of the HVAC actuator 20 may then be configured to decode the serially encoded position data contained in the single output control signal 18, and command the motor 26 to move the actuated part 24 to the desired position.

It is contemplated that the single output control signal 18 may be encoded with the serial position data in any suitable format or way. For example, the single output control signal 18 may include a series of strictly digital (i.e. DC) high and low voltage signals that collectively encode a desired position of the actuated part. Alternatively, the single output control signal 18 may include an AC signal, such as a 24 volt AC signal, that is cropped or otherwise modified during certain times (e.g. on half-cycles) to produce a series of "zeros" and "ones" (e.g. see FIG. 2). More generally, and in the illustrative embodiment, the single output control signal 18 may be in any suitable format that is capable of serially encoding a desired position value to the HVAC actuator 20.

In some cases, the motor 26 may already include a controller 22. For example, many DC brushless motors include a controller (e.g. microprocessor or microcontroller) for controlling the commutation of the motor during operation of the motor. It is contemplated that the controller 22 of the DC brushless motor 26 may be configured, through software or hardware enhancements, to receive and decode the position data from the single output control signal 18 provided by the controller 10. This may help reduce the cost of the overall system. However, it is contemplated that the controller 22 may be separate from the motor 26, if desired.

It is contemplated that the controller 10 may have any desired configuration suitable for producing the single output control signal 18, and in many cases, a single output control signal 18 that serially encodes a desired position of the actuated part 24. In the illustrative embodiment shown in FIG. 1, the controller 10 includes a processor 12 (e.g. microprocessor or microcontroller), and a switch 16. A 24 volt transformer provides a 24 volt AC signal to the switch 16, and the processor 12 selectively opens and closes the switch 16 to either pass or not pass the 24 volt AC signal to the single output control signal 18. In this embodiment, a "one" may be provided on the single output control signal 18 when the switch 16 is closed, and a "zero" may be provided on the single output control signal 18 when the switch 16 is open. The processor 12 may thus provide a series of "ones" and "zeros" onto the single output control signal 18 to encode a desired position (e.g. either an absolute position or a relative position) of the actuated part 24. In the illustrative embodiment, the switch 16 may be Triac (triode alternating current switch) as shown, a relay, a transistor, combinations thereof, or any other suitable switching device as desired.

It is contemplated that the processor 12 may be any suitable controller device, implemented in either hardware, software or a combination thereof. In many cases, the processor 12 may implement a control schedule, and may receive inputs from various sensors (e.g. temperature sensors, humidity sensors, occupancy sensors, airflow sensors, air quality sensors, and/or any other suitable sensor as desired) and/or other components, and provide appropriate control signals to an HVAC system and/or HVAC system components, as desired. In some embodiments, the controller 10 may be an electronic thermostat.

In other cases, the controller 10 may be configured to communicate with one or more thermostat and/or other controllers and may receive heat, cool, ventilation and/or other calls. The controller 10 may be linked to the one or more thermostats and/or other controllers via a communication path, upon which the various calls may be communicated. In response to the various calls, the controller 10 may provide an appropriate single output control signal 18 to communicate a desired position of the actuated part 24 to service the call. In some embodiments, the controller 10 may also be configured to provide other control signals to other components of an HVAC system, such as fan, heat, cool and/or other control signals, if desired.

Figure 2:
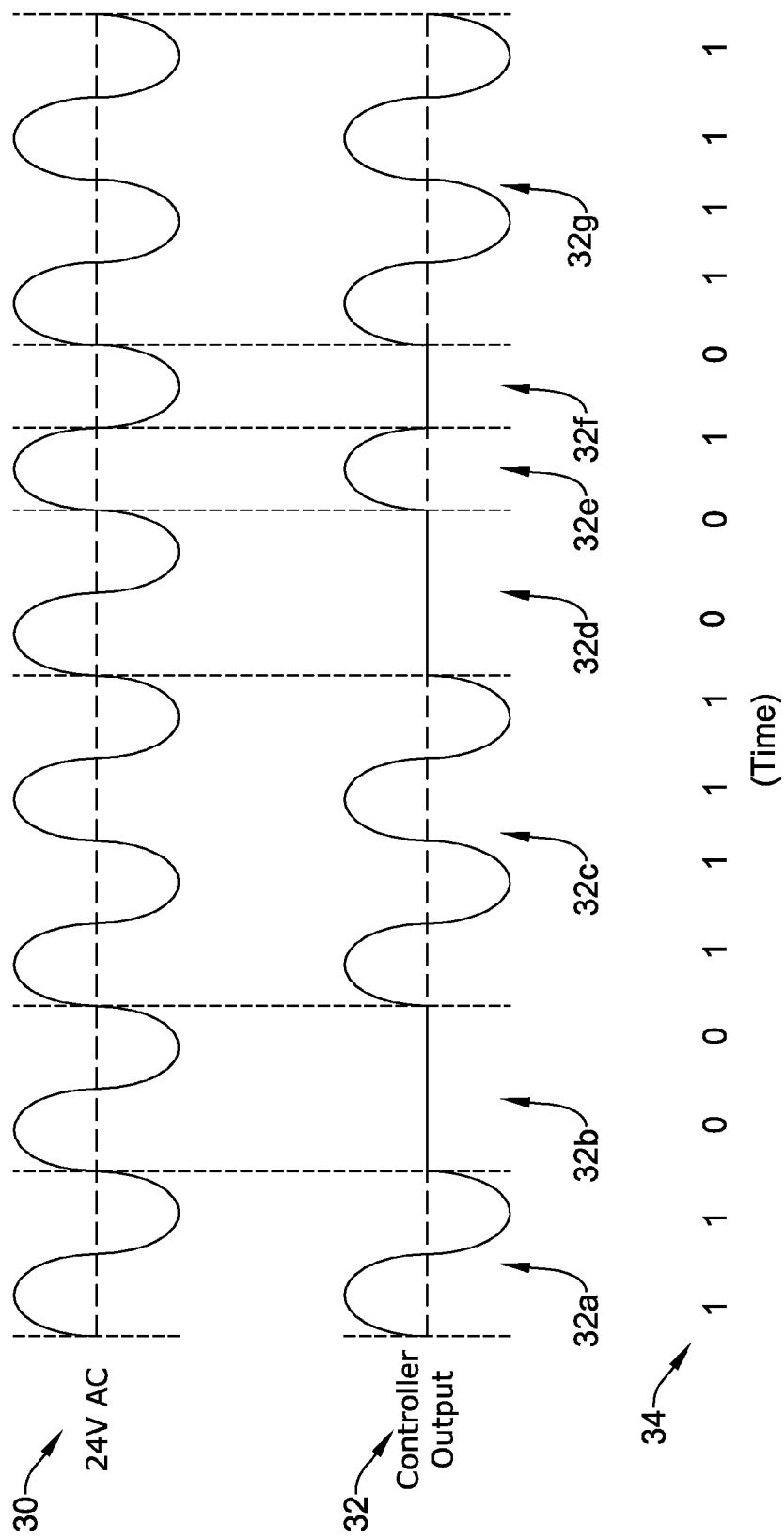
FIG. 2 is a graph of an illustrative single output control signal that may be provided by the controller to the HVAC actuator in FIG. 1.

FIG. 2 is a graph of an illustrative single output control signal 18 that may be provided by the controller 10 to the HVAC actuator 20 of FIG. 1. In the illustrative embodiment, the controller 10 encodes a serial position command on the single output control signal 18 by modulating the switch 16 on and off. For example, the processor 12 of FIG. 1 may switch the switch 16 between "on" and "off" states in a desired sequence to encode serial ones and zeros on the single output control signal 18. For example, when the switch 16 is in the "on" state, the 24 volt AC signal provided by 24 volt transformer of FIG. 1 is passed to the controller 22 of the HVAC actuator 20, indicating a "one" bit. When the switch 16 is in the "off" state, the 24 volt AC signal is not passed to the controller 22 of the HVAC actuator 20, indicating a "zero" bit. The processor 12 may modulate the switch 16 in a manner that creates a serial bit stream on the single output control signal 18 that represents a desired position for the actuated part 24. The serial bit stream can then be decoded by the controller 22 of the HVAC actuator 20, and suitable command signals can be sent by the controller 22 to the motor 26 to drive the actuated part 24 to the desired position.

One example serial bit stream is shown in FIG. 2. Graph 30 shows the 24 volt AC signal provided by the 24 volt AC transformer of FIG. 1 before it is encoded by the switch 16 and the processor 12. Graph 32 illustrates an encoded bit stream on the single output control signal 18 after being encoded by the switch 16 and the processor 12. As illustrated, the processor 12 turns the switch 16 on and off in a certain sequence that corresponds to an encoded position command for the actuated part 24 of the HVAC actuator 20.

In the example shown, the switch 16 is switched on by the processor 12 at times 32a, 32c, 32e, and 32g, representing logic "ones" in the serial bit stream on the single output control signal 18. At times 32b, 32d, and 32f, the switch 16 is switched off by the processor 12, representing logic "zeros" in the serial bit stream on the single output control signal 18. In the illustrative embodiment, the switching on and off of the switch 16 encodes a serial position command that can be received and decoded by the controller 22 of the HVAC actuator 20, and ultimately used to control the motor 26 of the HVAC actuator 20, which in turn, may control the position of the actuated part 24.

Graph 34 shows the serial bit stream produced by the signal shown in graph 32. Graph 34 assumes that each bit of the serial bit stream corresponds to one half-cycle of the 24 volt AC cycle. If the switch 16 is open, then the corresponding bit is considered a logic "one", and if the switch is closed, then the corresponding bit is considered a logic "zero". This is just one example of how a serial bit stream can be sent by controller 10 across the single output control signal 18 of FIG. 1. However, it is contemplated that any suitable method may be used to encode a position signal on the single output control signal 18 of FIG. 1. For example, and in no way limiting, it is contemplated that DC digital signals may be sent (e.g. 24V DC for logic "one", and 0V DC for logic "zero") across the single output control signal 18, or a serial bit stream may be modulated on top of a DC or AC signal, or any other suitable method may be used, as desired. In some cases, start and stop bits may be provided before and after the desired serial bit stream to indicate the beginning and end of an encoded position signal, but this is not required.

In another example, it is contemplated that the duration of having the switch 16 open and/or closed may communicate to the controller 22 a desired position of the actuated part 24. For example, if the switch 16 open for 10 cycles of the 24 volt AC signal, the controller 22 may decode this to mean that the actuated part 24 should be set at a 10% open position. Likewise, if the switch 16 open for 80 cycles of the 24 volt AC signal, this may be interpreted by the controller 22 that the actuated part 24 should be set at an 80% open position. As can be seen, there are a wide variety of ways to communicate a desired position across the single output control signal 18.

Figure 3:
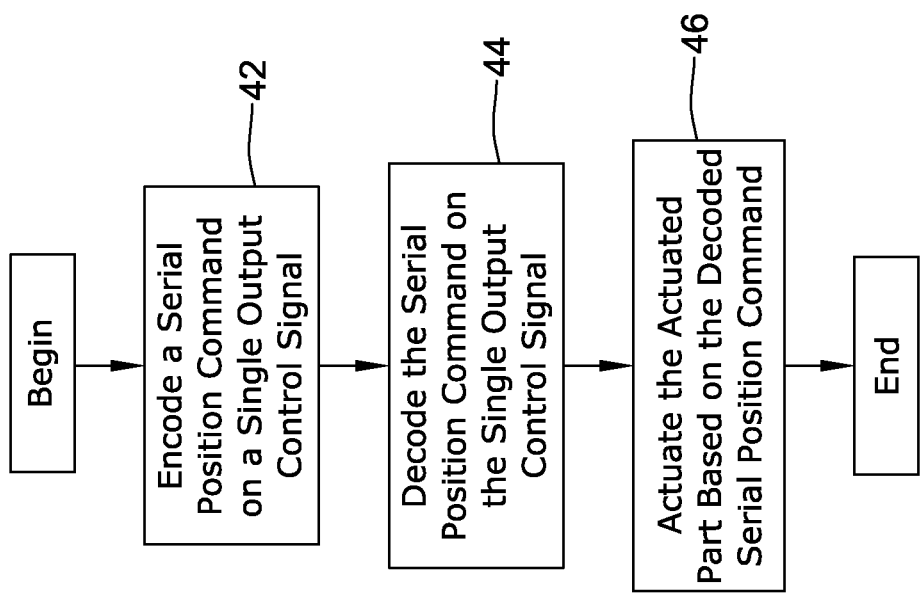
FIG. 3 is a flow diagram showing an illustrative method of controlling the position of the actuated part 24 of FIG. 1.

FIG. 3 is a flow diagram showing an illustrative method of controlling the position of the actuated part 24 of FIG. 1. The method begins by encoding a serial position command on a single output control signal, as shown at 42. Next, and as shown at 44, the serial position command that is encoded on the single output control signal is decoded. Then, the actuated part is actuated based on the decoded serial position command, as shown at 46.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respect, only illustrative. Changes may be made in details, particularly in matters of shape, size, and arrangement of parts without exceeding the scope of the invention. The invention's scope is, of course, defined in the language in which the appended claims are expressed.

What is claimed is:

1. An HVAC actuator, comprising:
   an actuated part for regulating the flow of a fluid through a conduit of an HVAC system;
   a motor coupled to the actuated part, the motor configured to drive the actuated part to various positions;
   an input port;
   a controller for receiving a serial bit stream including a sequence of two or more bits that are sequentially impressed on an input control signal at the input port of the HVAC actuator, wherein each of the two or more bits have a corresponding logic level, wherein the controller interprets a first logic level for a corresponding one of the two or more bits when an AC signal is present on the input control signal at the input port, and interprets a second logic level for a corresponding one of the two or more bits when the AC signal is not present on the input control signal at the input port, and wherein the logic levels of the sequence of two or more bits of the serial bit stream encode a value that relates to a desired position of the HVAC actuator; and
   the controller is further configured to decode the logic levels of the sequence of two or more bits of the serial bit stream on the input control signal to determine the value that corresponds to the desired position of the HVAC actuator, and to provide one or more control signals to the motor to drive the actuated part to the desired position.

2. The HVAC actuator of claim 1 wherein the motor is a DC brushless motor, and the controller is configured to control commutation of the motor.

3. A method for controlling an HVAC damper or valve having a motor and an actuated part for regulating the flow of a fluid through a conduit of an HVAC system, the method comprising the steps of:
   encoding a serial bit stream that includes a sequence of two or more bits on a single output control signal by sequentially modulating a substantially sinusoidal AC waveform, such that the presence of a half-cycle of the substantially sinusoidal AC waveform for one of the two or more bits is interpreted as a bit having a first logical value, and the absence of a half-cycle of the substantially sinusoidal AC waveform for one of the two or more bits is interpreted as a bit having a second logical value, wherein the logic levels for the sequence of two or more bits of the serial bit stream encode a value that corresponds to an absolute position of the HVAC damper or valve to regulate the flow of the fluid through the conduit of the HVAC system;
   sending the encoded serial bit stream to the HVAC damper or valve;
   decoding the logic levels of the sequence of two or more bits of the serial bit stream to determine the value that corresponds to the absolute position of the HVAC damper or valve; and
   providing one or more control signals to the motor to drive the actuated part to the absolute position.

4. The method of claim 3 wherein the decoding step is performed by a processor.

5. The method of claim 4 wherein the processor also controls commutation of the motor.

6. The method of claim 5 wherein the motor is a DC brushless motor.

7. The method of claim 3 wherein the encoding step includes selectively switching on and off a switch.

8. The method of claim 7 wherein the switch is a Triac, and a processor selectively switches the Triac on and off.

9. The method of claim 7 wherein the switch is a Triac, and a processor selectively switches the Triac on and off to encode the serial bit stream of two or more bits on the single output control signal.

10. The method of claim 9 wherein the switch is a Triac coupled to an AC signal, and the Triac passes the AC signal onto the single output control signal when the Triac is "on", and blocks the AC signal from reaching the single output control signal when the Triac is "off".

11. A system for controlling a position of an HVAC actuator using a single output control signal, the system comprising:
   a HVAC controller for controlling the position of the HVAC actuator, the HVAC controller including:
      an output port; and
      a processor for causing a sequence of two or more bits of a serial bit stream to be impressed upon the single output control signal at the output port by modulating a substantially sinusoidal AC signal, such that the presence of the substantially sinusoidal AC signal is interpreted as a first logic value for a corresponding one of the two or more bits, and the absence of the substantially sinusoidal AC signal is interpreted as a second logic value for a corresponding one of the two or more bits, wherein the logic levels of the sequence of two or more bits of the serial bit stream encode a value that relates to a desired position of the HVAC actuator;

wherein the HVAC actuator includes:
  an actuated part for regulating the flow of a fluid through a conduit of an HVAC system;
  a motor coupled to the actuated part, the motor configured to drive the actuated part to various positions;
  an input port coupled to the output port of the controller;
  a second controller for receiving the serial bit stream that is impressed on the single output control signal at the input port; and
  the second controller configured to decode the value from the logic levels of the sequence of two or more bits of the serial bit stream to determine the desired position of the HVAC actuator, and to provide one or more control signals to the motor to drive the actuated part to the desired position.

12. A controller for controlling a position of a remotely located HVAC actuator comprising:
  a HVAC controller for controlling the position of the HVAC actuator, the HVAC controller including:
    an output port;
    a processor for causing a serial bit stream having two or more bits to be impressed upon a single output control signal at the output port of the HVAC controller;
    a switch, wherein the processor controls the switch such that the switch controls a sequence of two or more bits of the serial bit stream that is impressed upon the single output control signal at the output port, wherein the switch, when open, provides an AC signal on the single output control signal which is interpreted as a first logic level for a corresponding one of the two or more bits, and when closed, prevents the AC signal from reaching the single output control signal which is interpreted as a second logic level for a corresponding one of the two or more bits; and
    wherein the logic levels of the sequence of two or more bits of the serial bit stream encode a value that corresponds to an absolute position of the HVAC actuator.

13. The controller of claim 12 wherein the HVAC actuator includes:
  an actuated part;
  a motor coupled to the actuated part, the motor configured to drive the actuated part to various positions;
  an input port coupled to the output port of the HVAC controller;
  a second controller for receiving the two or more bits of the serial bit stream that is impressed on the single output control signal at the input port; and
  the second controller configured to decode the logic levels of the sequence of two or more bits of the serial bit stream to determine the absolute position of the HVAC actuator, and provide one or more control signals to the motor to drive the actuated part to the absolute position.

14. The controller of claim 13 wherein the switch is a Triac.

15. The controller of claim 13 wherein the motor is a DC brushless motor, and the second controller is configured to control commutation of the motor.

16. The controller of claim 12 wherein the switch, when open, provides a logic "one" for the corresponding one of the two or more bits on the single output control signal, and when closed, provides a logic "zero" for the corresponding one of the two or more bits on the single output control signal.

17. The controller of claim 12 wherein the switch, when open, provides a logic "zero" for the corresponding one of the two or more bits on the single output control signal, and when closed, provides a logic "one" for the corresponding one of the two or more bits on the single output control signal.

* * * * *